US008949611B1

(12) United States Patent
Kimberly et al.

(10) Patent No.: US 8,949,611 B1
(45) Date of Patent: Feb. 3, 2015

(54) METHODS, APPARATUS AND COMPUTER PROGRAM PRODUCTS FOR AUTHENTICATING AND DETERMINING INTEGRITY OF A SOFTWARE PART OF AN AIR VEHICLE

(75) Inventors: Greg A. Kimberly, Seattle, WA (US); Jack Lawson, Newcastle, WA (US); Todd William Gould, Marysville, WA (US); Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/166,489

(22) Filed: Jun. 22, 2011

(51) Int. Cl.
*H04L 9/32* (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| 2005/0027987 | A1* | 2/2005 | Neufeld et al. ................ 713/176 |
| 2009/0138871 | A1 | 5/2009 | Kimberly et al. |
| 2009/0138872 | A1 | 5/2009 | Fuchs et al. |
| 2009/0138874 | A1* | 5/2009 | Beck et al. ..................... 717/173 |

OTHER PUBLICATIONS

Robinson, R., et al.; "*Electronic Distribution of Airplane Software and the Impact of Information Security on Airplane Safety*;" International Conference on Computer Safety, Reliability and Security; Safecomp; dated 2007; retrieved on Apr. 10, 2013.

\* cited by examiner

*Primary Examiner* — Esther Benoit
(74) *Attorney, Agent, or Firm* — Alston & Bird LLP (57) ABSTRACT

Methods, apparatus and computer program products are provided to authenticate and determine the integrity a software part. In this regard, a software part is authenticated and its integrity is determined by determining a first hash of the digital data that comprises the software part. If the air vehicle lacks data communications connectivity with an off-board security system, the method determines the authenticity and integrity of the software part by decrypting an encrypted hash of a software part in accordance with a public-private key pair to create a decrypted hash, comparing the first hash with the decrypted hash and transmitting the first hash to the off-board security system once data communications connectivity is established. Conversely, if the air vehicle has data communications connectivity with the off-board security system, the method determines the integrity of the software part by transmitting the first hash to the off-board security system for comparison with a whitelist.

20 Claims, 3 Drawing Sheets

METHODS, APPARATUS AND COMPUTER PROGRAM PRODUCTS FOR AUTHENTICATING AND DETERMINING INTEGRITY OF A SOFTWARE PART OF AN AIR VEHICLE

TECHNOLOGICAL FIELD

Embodiments of the present disclosure relate generally to methods, apparatus and computer program products for authenticating and determining integrity of a software part, and, more particularly, to methods, apparatus and computer program products for authenticating and determining integrity of a software part onboard an air vehicle.

BACKGROUND

Aircraft and other air vehicles oftentimes include a member of software parts, such as software programs. These software parts may perform a wide variety of functions upon execution. For example, some software parts facilitate the operation of the air vehicle including software programs that are utilized in navigation including navigation maps, propulsion, communications and the like, while other software parts support the passenger experience by at least partly controlling heating, ventilation and cooling operations, entertainment systems and the like. Of the software parts onboard an aircraft, many software parts are designed and provided by a vendor. The vendor may be the manufacturer of the air vehicle or a subcontractor or other supplier that supplies software parts to the manufacturer for integration into the air vehicle. In regards to an aircraft, the vendor may provide the software parts to an airline and the airline may, in turn, provision one or more of the aircraft in its fleet with the software parts.

It may be desirable in many instances to confirm the integrity of the software parts that are installed upon an air vehicle to insure that the air vehicle performs as intended. In this regard, it may be desirable to identify a software part that has been corrupted or otherwise modified while in transit from the vendor and/or the airline to the air vehicle. In addition to the corruption or modification of an otherwise authentic software part, it may also be desirable to identify any software parts that are simply not authorized, such as by not being provided by an authorized vendor and/or not being sanctioned or otherwise authorized by the airline.

The authenticity and integrity of some software parts has been maintained by storing the software parts on a physical media, such as a floppy disk, compact disk or the like, and then handling and transferring the physical media in a secure manner. In this regard, the physical media could be shipped in a secure manner, the media content could be electronically inspected and a cyclic redundancy check (CRC) could be performed by the equipment onboard the air vehicle to confirm its authenticity and integrity. However, many software parts are now distributed electronically such that the techniques for insuring authenticity and integrity that were employed for the handling and transfer of physical media are much less applicable.

BRIEF SUMMARY

Methods, apparatus and computer program products are provided in accordance with embodiments of the present disclosure in order to authenticate and determine the integrity of a software part of an air vehicle. The methods, apparatus and computer program products of one embodiment may authenticate and determine the integrity of the software parts both in an instance in which data communication connectivity is established with an off-board security system as well as in an instance in which the air vehicle lacks data communication connectivity with an off-board security system. The method, apparatus and computer program product of one embodiment may utilize different techniques to authenticate and determine the integrity of the software part in different manners depending upon whether or not the air vehicle has data communication connectivity with an off-board security system, thereby permitting the method, apparatus and computer program product of this embodiment to take advantage of the advantageous features of each of the authentication and integrity determination techniques while concurrently mitigating any risk associated with each of the authentication and integrity determination techniques.

In one embodiment, a method is provided for authenticating and determining the integrity of a software part of an air vehicle by determining a first hash of the digital data that comprises the software part. In an instance in which the air vehicle lacks data communications connectivity with an off-board security system, the method determines the authenticity and integrity of the software part by decrypting an encrypted hash of a software part in accordance with a public-private key pair to create a decrypted hash, comparing the first hash with the decrypted hash and thereafter transmitting the first hash to the off-board security system once data communications connectivity is established to, for example, audit the integrity of the software part. Conversely, in an instance in which the air vehicle has data communications connectivity with the off-board security system, the method determines integrity of the software part by transmitting the first hash to the off-board security system for comparison with a whitelist including a plurality of hashes of authentic software parts. By initially authenticating and determining the integrity of the software part without reference to a whitelist onboard the air vehicle, such as in an instance in which the air vehicle lacks data communications connectivity with an off-board security system, the whitelist may be maintained in a central location, which facilitates the whitelist being maintained or updated in an efficient and timely manner even in instances in which the software parts are provided by a plurality of vendors.

The determination of the authenticity and integrity of the software part in an instance in which the air vehicle lacks data communications connectivity with an off-board security system may include initially authenticating and determining the integrity of the software part in an instance in which the first hash matches the decrypted hash. In one embodiment, the determination of the authenticity and integrity of the software part in an instance in which the air vehicle lacks data communications connectivity with an off-board security system may include flagging the software part as potentially lacking authenticity and/or integrity in an instance in which the first hash fails to match the decrypted hash. The decryption of an encrypted hash of a software part may include decrypting a hash of a software part that has been encrypted with a private key of an airline with a public key of the airline. In order to maintain the authenticity of the public key, the public key may be maintained in certificates or other digital documents that are, in turn, signed by other private-public key pairs that are held by trusted institutions, e.g., Certificate Authorities. In one embodiment, however, an airline may store certificates containing its public keys in its air vehicles. The method of one embodiment may also update the whitelist as the software parts carried by the air vehicle change, although the updating of the whitelist may require significant effort, particularly in instances in which the software parts are provided by a plurality of vendors and/or in instances in which the whitelist is distributed. As such, the whitelist may be maintained at a centralized location to facilitate its maintenance in an efficient manner.

In another embodiment, a system is provided for authenticating and determining the integrity of a software part of an air vehicle that includes an on-board computing system configured to determine a first hash of digital data that includes the software part. The on-board computing system is also configured to determine the authenticity and integrity of the software part in an instance in which the air vehicle lacks data communications connectivity with an off-board security system by decrypting an encrypted hash of a software part in accordance with a public-private key pair to create a decrypted hash, comparing the first hash with the decrypted hash, and thereafter transmitting the first hash to the off-board security system once data communications connectivity is established to, for example, audit the integrity of the software part. The on-board computing system is further configured to determine the integrity of the software part in an instance in which the air vehicle has data communications connectivity with the off-board security system by transmitting the first hash to the off-board security system for comparison with a whitelist including a plurality of hashes of authentic software parts. The whitelist may be updated as the software parts carried by the air vehicle change.

The on-board computing system may also be configured such that the determination of the authenticity and integrity of the software part in an instance in which the air vehicle lacks data communications connectivity with an off-board security system may include an initial authentication and determination of the integrity of the software part in an instance in which the first hash matches the decrypted hash. In one embodiment, the on-board computing system may be further configured such that the determination of the authenticity and integrity of the software part in an instance in which the air vehicle lacks data communications connectivity with an off-board security system may include flagging the software part as potentially lacking authenticity and/or integrity in an instance in which the first hash fails to match the decrypted hash. The on-board computing system may also be configured to decrypt an encrypted hash of a software part by decrypting a hash of a software part that has been encrypted with a private key of an airline with a public key of the airline.

In a further embodiment, a computer program product is provided for authenticating and determining the integrity of a software part of an air vehicle. The computer program product includes at least one computer-readable storage medium having computer-executable program code portions stored therein. The computer-executable program code portions include program code instructions for determining a first hash of digital data that comprises the software part. The computer-executable program code portions also include program code instructions for determining authenticity and integrity of the software part in an instance in which the air vehicle lacks data communications connectivity with an off-board security system. In this regard, the program code instructions may determine the authenticity and integrity of the software part in an instance in which data communications connectivity is lacking by decrypting an encrypted hash of a software part in accordance with a public-private key pair to create a decrypted hash, comparing the first hash with the decrypted hash and thereafter transmitting the first hash to the off-board security system once data communications connectivity is established. The computer-executable program code portions may also include program code instructions for determining integrity of the software part in an instance in which the air vehicle has data communications connectivity with the off-board security system by transmitting the first hash to the off-board security system for comparison with a whitelist including a plurality of hashes of authentic software parts.

The program code instructions for determining the authenticity and integrity of the software part in an instance in which the air vehicle lacks data communications connectivity with an off-board security system may include program code instructions for initially authenticating and determining the integrity of the software part in an instance in which the first hash matches the decrypted hash. In one embodiment, the program code instructions for determining the authenticity and integrity of the software part in an instance in which the air vehicle lacks data communications connectivity with an off-board security system may include program code instructions for flagging the software part as potentially lacking authenticity and/or integrity in an instance in which the first hash fails to match the decrypted hash. The program code instructions for decrypting an encrypted hash of a software part may include program code instructions for decrypting a hash of a software part that has been encrypted with a private key of an airline with a public key of the airline. In one embodiment, the computer-executable program code portions may also include program code instructions for updating the whitelist as the software parts carried by the air vehicle change.

In accordance with embodiments of the present disclosure, a method, apparatus and computer program product are provided in order to authenticate and determine the integrity of a software part of an air vehicle in a timely manner regardless of whether or not the air vehicle has data communications connectivity with an off-board security system. However, the features, functions and advantages that have been discussed may be achieved independently and the various embodiments of the present disclosure may be combined in the other embodiments, further details of which may be seen with reference to the detailed description and drawings.

BRIEF DESCRIPTION OF THE SEVERAL VIEWS OF THE DRAWINGS

Having thus described embodiments of the present disclosure in general terms, reference will now be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

An air vehicle 10, such as an aircraft, may include a plurality of software parts designated, for example, as software (SW) part 1, SW part 2 . . . SW part n, in the embodiment of FIG. 1. The plurality of software parts may be software programs or applications and may be configured to provide various functionality to the air vehicle upon execution. The air vehicle may initially include an original set of software parts. However, the software parts generally do not remain static, but change over time with new software parts being added and existing software parts being modified.

Figure 1:
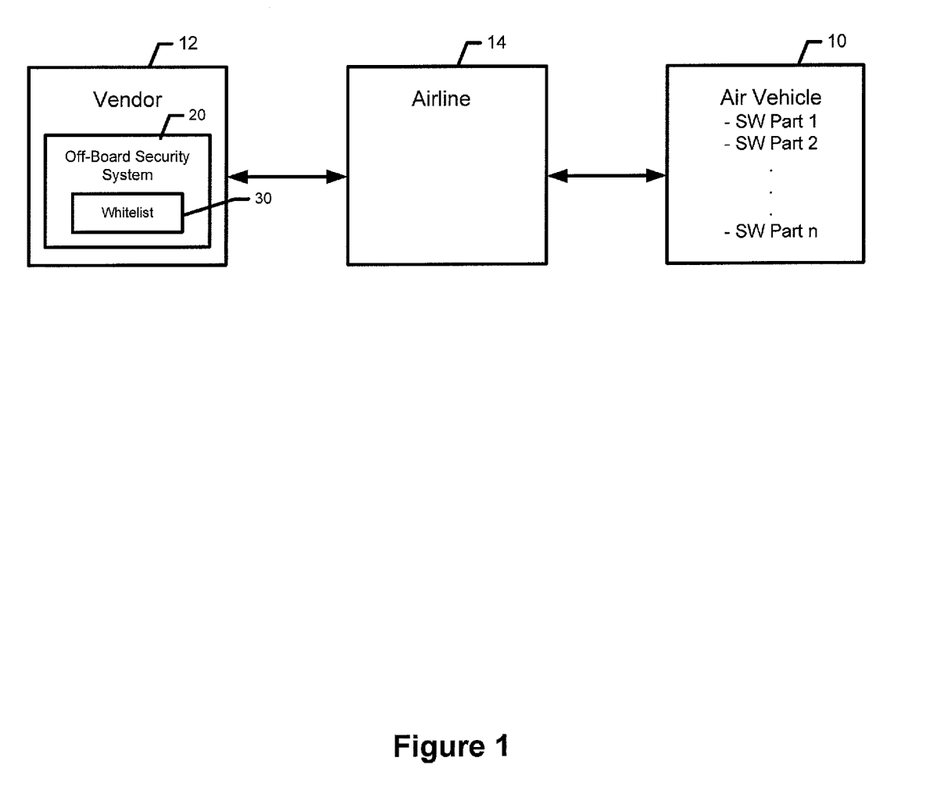
FIG. 1 is a block diagram illustrating a system in which a software part is provided to an air vehicle in accordance with one embodiment of the present disclosure.

The software parts, such as the new or modified software parts, may be provided by a vendor 12, such as the manufacturer of the air vehicle or a subcontractor or other supplier of the manufacturer, as shown in FIG. 1. In an embodiment in which the air vehicle 10 is an aircraft that belongs to a respective airline 14, the vendor may provide the new or modified software part to the airline which, in turn, may provide the new or modified software part to the aircraft.

Prior to execution of the new or modified software part during operation of the air vehicle 10, however, the new or modified software part may be authenticated and the integrity may be determined in accordance with one embodiment of the present disclosure. In an embodiment such as shown in FIG. 1 in which the vendor 12, the airline 14 and the aircraft communicate via respective communication links, such as wired or wireless communication links, the digital data that comprises the software part may be encrypted to enhance its security. In one embodiment, for example, the digital data comprising the software part may be encrypted in accordance with a public key infrastructure (PKI) technique employing a public/private key pair. By way of example, the vendor may encrypt a representation of the digital data that comprises the software part with the private key of the vendor. While the digital data that comprises the software part may be encrypted with the private key of the vendor, the vendor of one embodiment may initially create a hash of the digital data that comprises the software part and may then encrypt the hash of the software part with the private key of the vendor, thereby creating an encrypted hash. The vendor may then transmit the encrypted hash and the software part to the airline.

Upon receipt, the airline 14 may decrypt the encrypted hash with the public key of the vendor 12, thereby creating a decrypted hash. Additionally, the airline may independently determine the first hash of the digital data that comprises the software part and may then compare the decrypted hash with the hash that has been independently generated by the airline. In an instance in which the decrypted hash and the first hash that has been independently generated by the airline match, the airline will consider the software part that is received from the vendor to have integrity and to have been authenticated. However, if the decrypted hash and the first hash that has been independently generated by the airline do not match, the airline may flag the software part as lacking authenticity and/or integrity and may communicate with the vendor to advise the vendor that the software part was flagged as being potentially unauthentic and/or potentially lacking integrity. In response the vendor may transmit another copy of the software part and/or take other remedial actions.

In an instance in which the airline 14 determines that the software part received from the vendor 12 has integrity and is authentic, the airline may, in turn, transmit the software part to the aircraft 10. In this regard, the airline may encrypt the digital data that comprises the software part in accordance with a PKI technique that employs a public/private key pair. In this regard, the airline may encrypt a representation of the digital data that comprises the software part with a private key of the airline. While the digital data that comprises the software part may be encrypted with the private key of the airline, the airline of one embodiment may initially generate a hash of the digital data that comprises the software part and then encrypt the hash of the software part with the private key of the airline, thereby creating an encrypted hash. The airline may then transmit the encrypted hash and the software part to the aircraft.

Upon receipt of the encrypted hash and the software part from the airline 14, the aircraft 10 may evaluate the software part to determine its authenticity and integrity. In this regard, the aircraft may initially decrypt the encrypted hash of the software part with the public key of the airline, thereby creating a decrypted hash. After determining the first hash of the digital data that comprises the software part, the aircraft may compare the first hash that has been independently generated by the aircraft with the decrypted hash provided by the airline. In an instance in which the first hash that has been independently generated by the aircraft matches the decrypted hash provided by the airline, the software part will be considered to have integrity and to have been authenticated and may then be installed upon the aircraft. However, in an instance in which the first hash that has been independently generated by the aircraft fails to match the decrypted hash provided by the airline, the software part may be considered to lack authenticity and/or integrity and a message may be provided to the airline indicating the failure of the software part to satisfy the authenticity and/or integrity test. In response, the airline may transmit another copy of the software part and/or take other remedial actions.

Reliance upon the public key infrastructure to authenticate and determine the integrity of the software part may advantageously provide a mechanism for determining the authenticity and integrity of a set of software parts that are rapidly and/or repeatedly changing. However, reliance upon the public key infrastructure for the authentication and the determination of the integrity of software parts may come with a risk that a private key, such as the private key of any one of a plurality of vendors and/or the private key of the airline, may be stolen which may compromise the integrity of the system, but which cannot be detected from an inspection of the system. Additionally, PKI techniques may require a certificate with a limited lifetime and a revocation status that should be reviewed on a timely basis. To permit a review of the certificate revocation status, the air vehicle 10 should be able to communicate with a certificate authority. In some instances, however, the air vehicle may be unable to establish a connection with the certificate authority and, as such, may be unable to determine the certificate revocation status in a timely manner.

As such and in accordance with an embodiment of the present disclosure, a method, apparatus and a computer program product are provided for determining the authenticity and integrity of a software part by relying upon the PKI techniques in some circumstances and relying upon a whitelist of the hashes of authentic software parts in other circumstances. Accordingly, the method, apparatus and computer program product of one embodiment may be designed to enjoy the advantages of each of these techniques for authenticating and determining the integrity of a software part while mitigating against the risks associated with each technique.

Figure 2:
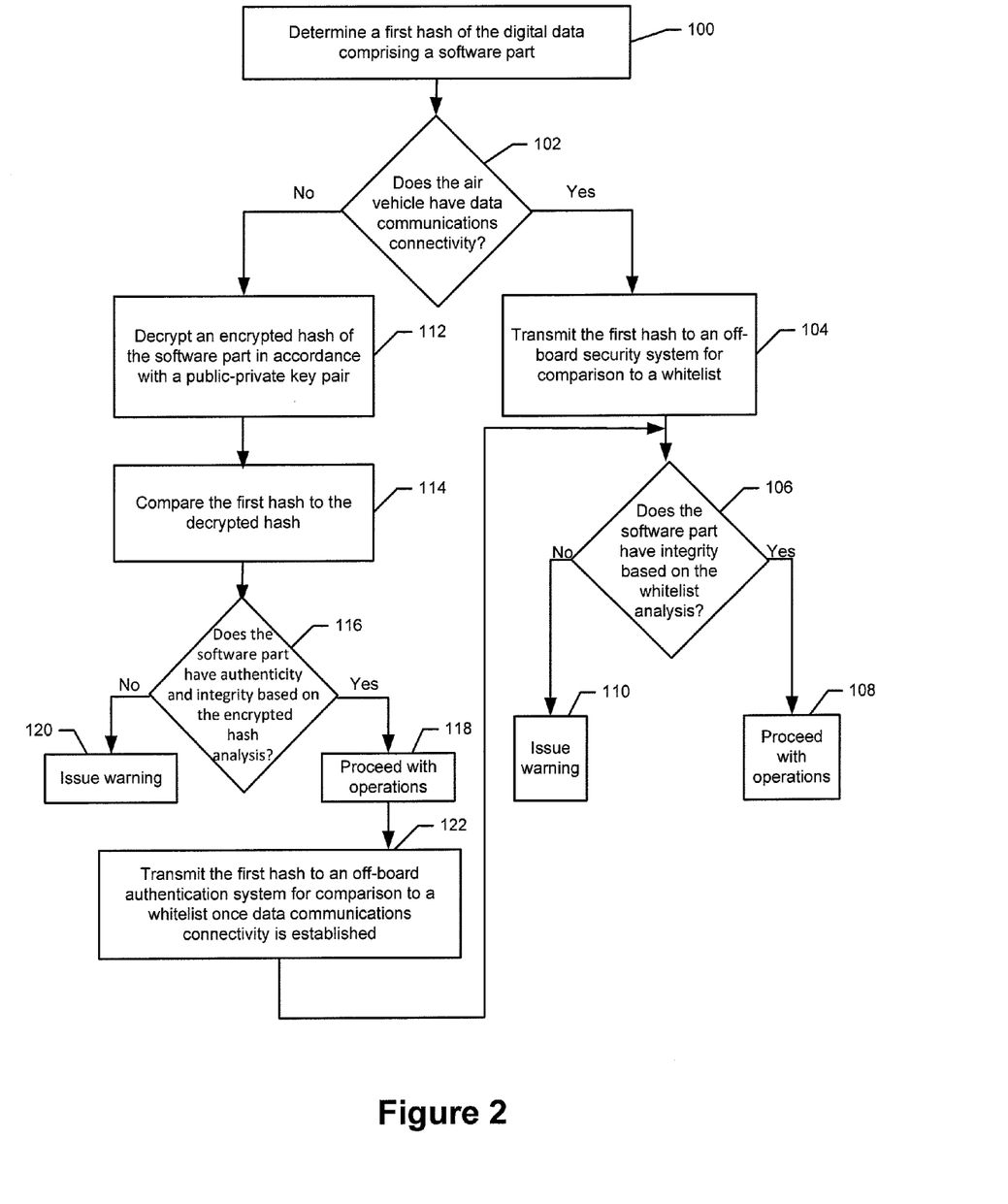
FIG. 2 is a flow chart illustrating operations performed in accordance with one embodiment of the present disclosure.

As shown in operation 100 of FIG. 2, the first hash of the digital data comprising a software part may be initially determined. Indeed, as described above, an air vehicle 10 may determine the first hash of the digital data comprising a new or modified software part in conjunction with the evaluation of the PKI signature of the software part. Thus, embodiments of the method, apparatus and computer program product of the present disclosure leverage the determination of the first hash of the digital data comprising a software part so as to reduce the data processing required to determine the authenticity and integrity of the software part. The air vehicle may determine the first hash of the digital data that comprises the software part in various manners including the determination of any one of a plurality of predefined types of hashes, such as an SHA-256 hash function.

Figure 3:
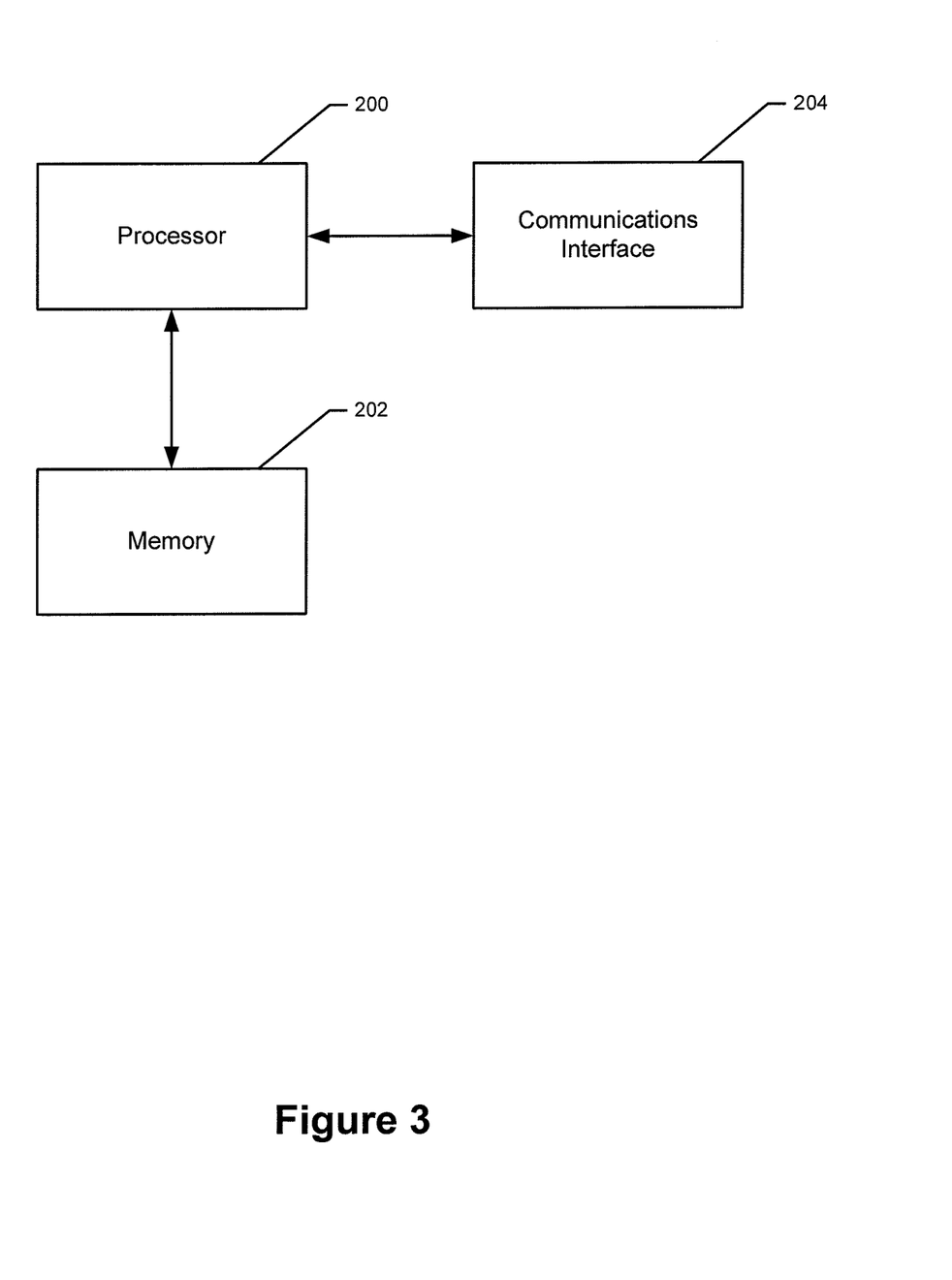
FIG. 3 is a block diagram of an apparatus for authenticating and determining the integrity of a software part of an air vehicle in accordance with one embodiment of the present disclosure.

Although the air vehicle 10 may be configured in various manners, the air vehicle of one embodiment includes a computing device as shown in FIG. 3. In this regard, the computing device of one embodiment of the present disclosure may include specifically configured processing circuitry such as a specifically configured processor 200, and an associated memory device 202, both of which are commonly comprised by a computer or the like. In this regard, the operations of the air vehicle that are described herein and are set forth generally in FIG. 2 can be performed by the processor executing a computer program instructions stored by the memory device. For example, the determination of the first hash of the digital data comprising the software part described above in conjunction with operation 100 may be performed by the processor of the air vehicle. The computing device can also include or be associated with a communication interface 204 including, for example, one or more transceivers for communicating via a wired or wireless communications link with the airline 14, the vendor 12 or the like.

The processor 200 may operate under control of a computer program product. In this regard, the computer program product for performing the methods of embodiments of the present disclosure includes a computer-readable storage medium, such as a non-volatile, non-transitory storage medium, and computer-readable program code portions, such as a series of computer instructions, embodied in the computer-readable storage medium.

Returning now to FIG. 2 and, in particular to operation 102 of FIG. 2, a determination is then made, such as by the processor 200, as to whether the air vehicle has data communications connectivity with the ground, such as with an off-board security system. In this regard, an air vehicle may sometimes have data communications connectivity with the ground, such as an off-board security system, and at other times may not have data communications connectivity with the ground, such as the off-board communication system. The data communications connectivity may be supported in various manners including via a wireless communications link, a wireline communications link or the like. Depending upon whether or not the aircraft has data communication capabilities with the ground and, more particularly, the off-board security system, the method, apparatus and computer program product of one embodiment may differently authenticate and determine the integrity of the software part. In one embodiment, however, even in an instance in which the aircraft does not have data communication connectivity with the ground, the software part may still be authenticated and the integrity may still be determined in a timely manner without waiting for data communication connectivity to subsequently be reestablished.

In an instance in which the air vehicle 10 has data communications connectivity with the ground, such as in an off-board security system, the air vehicle, such as the processor 200 or communication interface 204, may transmit the first hash that has been determined from the digital data comprising the software part to the off-board security system. The off-board security system may be maintained by any of the various parties, such as a vendor 12 or the airline 14 or by an escrow agent or the like, or may be independent of the various parties. As shown in FIG. 2, for example, the off-board security system 20 may be maintained by the vendor, such as the aircraft manufacturer or a supplier or other subcontractor of the aircraft manufacturer, or another third party, such as an escrow agent or the like. Regardless of the party that maintains the off-board security system, the off-board security system includes a whitelist 30. The whitelist contains a list of the hashes for each of the software parts that are to be installed upon the air vehicle. The whitelist may be initially created upon the manufacturer or initial provisioning of the air vehicle and may thereafter be updated as additional software parts are added, existing software parts are modified or otherwise changed or other software parts are removed or eliminated.

The off-board security system 20 may also be embodied by a computing device, such as of the type shown in FIG. 3 and described above, which includes a memory device 202 for storing the whitelist 30 and a communication interface 204 for communicating with the air vehicle 10, such as by means of a wired communications link, a wireless communications link or the like. In this regard, the communications interface of the off-board security system may receive the first hash of the respective software part from the air vehicle. See operation 104. The off-board security system may also include a processor 200 for comparing the first hash of the respective software part to the hashes for the authentic software parts that are included within the whitelist in order to determine if the respective software part has integrity. See operation 106. In an instance in which the first hash of the respective software part is included within the whitelist, the off-board security system may determine that the respective software part has integrity and may cause a message to be transmitted to the air vehicle, such as via the communications interface, indicating that the respective software part has integrity. Thereafter, the air vehicle can proceed with normal operations as shown in operation 108 including the installation and subsequent execution of the software part. Alternatively, in an instance in which the first hash of the respective software part is not included within the whitelist, the off-board security system can cause a message to be transmitted to the air vehicle, again such as via the communications interface, indicating that the respective software part lacks integrity. In this instance, the air vehicle can refrain from installing and executing the respective software part and may, in turn, cause a warning message to be issued advising the airline 14 and/or the vendor 12 of the potential lack of integrity of the respective software part such that a replacement software part may be provided or other remedial action may be taken. See operation 110.

The comparison of a first hash of a respective software part to the hashes of authentic software parts maintained by a whitelist is a relatively robust technique for determining the integrity of a software part in that the whitelist can be readily updated with additional or different hashes as software parts are correspondingly added or modified. Moreover, hashes and whitelists that include hashes are not constrained by certificate management and certificate expiration as are PKI techniques. However, the whitelists that are consulted to determine the integrity of a software part are generally off-board the air vehicle 10. In this regard, a whitelist may be stored on-board an air vehicle, but such an on-board whitelist may be more challenging to update with new or different hashes since the new or different hashes are generally provided by the vendors 12 and/or the airline 14 and must be communicated to the air vehicle, such as via a data communications link. Such challenges may be exacerbated in instances in which the software parts are provided by a large number of vendors, each of which may update the whitelist. Since the air vehicle may not always have data communications connectivity, a whitelist on-board the air vehicle may not be updated in as timely of a manner as a whitelist maintained by a vendor or the airline. As such, the whitelist that is consulted in accordance with an embodiment of the present disclosure is generally maintained by an off-board security system 20. Moreover, while the off-board security system may be maintained by various parties, the security of the off-board security system may be enhanced by maintenance of the off-board security system by the vendor since the whitelist of this embodiment would not need to be transmitted to other parties, such as the airline, thereby eliminating at least some risk that the whitelist could be modified during its transmission or during storage.

As noted above, reliance upon an off-board security system 20 for the determination of the integrity of a respective software part is dependent upon data communications connectivity between the air vehicle 10 and the off-board security system. While the air vehicle may have such data communications connectivity at some times, the air vehicle may not have such data communications connectivity at other times. In these other times in which the air vehicle does not have data communications connectivity with the off-board security system, the method, apparatus and computer program product of one embodiment of the present disclosure cannot rely upon the off-board security system to determine the integrity of a respective software part, at least not in a timely manner. Instead, the method, apparatus and computer program of one embodiment of the present disclosure rely upon PKI techniques for determining the authenticity and integrity, at least initially, of a respective software part in an instance in which the air vehicle does not have data communications connectivity with the off-board security system. As such, the method, apparatus and computer program product of this embodiment of the present disclosure may determine the authenticity and integrity of the respective software part without awaiting subsequent establishment of the data communications connectivity with the off-board security system.

As shown in operation 112 of FIG. 2, the air vehicle 10, such as the processor 200 of the air vehicle, may decrypt an encrypted hash of the respective software part in accordance with a public/private key pair in an instance in which the air vehicle does not have data communications connectivity. In this regard, the hash of the respective software part that is received via the communications interface 204 from the airline 14 may have been encrypted with the private key of the airline. As such, the air vehicle, such as the processor of the air vehicle, may decrypt the hash of the respective software part with the public key of the airline. Following decryption, the air vehicle, such as the processor of the air vehicle, may compare the first hash that has been previously determined, such as in operation 100, with the decrypted hash that is provided by the airline along with the respective software part. See operation 114. Based on this comparison, the air vehicle, such as the processor of the air vehicle, may determine if the respective software part is authentic and has integrity as shown in operation 116.

In an instance in which the first hash that has been computed from the digital data that comprises the software part matches the decrypted hash, the air vehicle 10, such as the processor 200 of the air vehicle, may determine that the respective software part is authentic and has integrity and may then proceed with normal operations including installation and execution of the respective software part. See operation 118. Alternatively, in an instance in which the first hash that has been computed from the digital data that comprises a software part does not match the decrypted hash, the air vehicle, such as the processor of the air vehicle, may determine the respective software part to not be authentic and/or to lack integrity and may cause a warning message to be transmitted to another party, such as the airline 14, a vendor 12 or the like, notifying the other party that the respective software part lacks authenticity and/or integrity such that an authentic version of the respective software part may be provided to the air vehicle and/or other remedial operations may be taken. See operation 120.

By relying on a PKI technique to authenticate and determine the integrity of the respective software part, at least initially, the air vehicle 10 may determine the authenticity and integrity of the software part in a timely manner even in an instance in which the air vehicle does not have data communications connectivity with an off-board security system 20. In an instance in which the respective software part is determined to be authentic and to have integrity, operations of the air vehicle may proceed without having to await establishment of data communications connectivity in order to determine the authenticity and integrity of the respective software part. However, a determination of the authenticity and integrity of a respective software part may come with a risk that the private key has been stolen and the encryption/decryption of the respective software part has been compromised. As such, the method, apparatus and computer program product of one embodiment may also confirm the integrity of the respective software part (that has been initially determined to have integrity by the PKI technique) at a later time once the data communications connectivity has been established. In this regard, the air vehicle, such as the processor 200 and/or the communications interface 204 of the air vehicle, may cause the first hash of the digital data comprising the software part to be transmitted to the off-board security system once data communications connectivity has been established. See operation 122. The off-board security system, such as the processor of the off-board security system, may then compare the first hash provided by the air vehicle to the hashes included within the whitelist to determine if the respective software part has integrity and may then proceed as described above in conjunction with operations 106, 108 and 110.

Thus, the reliance upon the PKI technique to initially determine the authenticity and integrity of a respective software part in an instance in which the air vehicle 10 does not have data communications connectivity with an off-board security system 20, allows the respective software part to be initially authenticated and determined to have integrity and for operations of the air vehicle to proceed in a timely manner. However, the risks associated with the PKI technique may be mitigated by subsequently auditing the integrity of a respective software part with an off-board security system that includes a whitelist once the data communications connectivity has been established. Thus, even in an instance in which the private key has been stolen and the PKI technique has been compromised, the audit of the authenticity of the respective software part by the off-board security system may subsequently identify the respective part to lack integrity, thereby limiting the damage that may be occasioned by installation and execution of the respective software part.

As described above, FIG. 2 is a flowchart of methods, apparatus and program products according to embodiments of the present disclosure. It will be understood that each block or step of the flowchart, and combinations of blocks in the flowchart, can be implemented by computer program instructions. These computer program instructions may be loaded onto a computing device, such as shown in FIG. 3, or other programmable apparatus to produce a machine, such that the instructions which execute on the computing device or other programmable apparatus create means for implementing the functions specified in the flowchart block(s) or step(s). These computer program instructions may also be stored in a computer-readable memory, e.g., memory device 202, that can direct a computing device or other programmable apparatus to function in a particular manner, such that the instructions stored in the computer-readable memory produce an article of manufacture including instructions which implement the function specified in the flowchart block(s) or step(s). The computer program instructions may also be loaded onto a computing device or other programmable apparatus to cause a series of operational steps to be performed on the computing device or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions and combinations of steps for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for authenticating and determining integrity of a software part of an air vehicle comprising:
   determining a first hash of digital data that comprises the software part; and
   utilizing first and second different techniques to determine authenticity and integrity of the software part depending upon whether the air vehicle has data communications connectivity with an off-board security system in which case the first technique is utilized or lacks data communications connectivity with the off-board security system in which case the second technique is utilized,
   wherein, in an instance in which the air vehicle lacks data communications connectivity with the off-board security system, determining authenticity and integrity of the software part in accordance with the second technique by:
      decrypting an encrypted hash of a software part in accordance with a public-private key pair to create a decrypted hash;
      comparing the first hash with the decrypted hash;
      executing the software part in an instance in which the first hash matches the decrypted hash without awaiting establishment of data communications connectivity with the off-board security system; and
      thereafter transmitting the first hash to the off-board security system, following execution of the software part, once data communications connectivity is established; and
   wherein, in an instance in which the air vehicle has data communications connectivity with the off-board security system, determining the integrity of the software part in accordance with the first technique by transmitting the first hash to the off-board security system for comparison with a whitelist including a plurality of hashes of authentic software parts.

2. A method according to claim 1 wherein determining authenticity and integrity of the software part in an instance in which the air vehicle lacks data communications connectivity with an off-board security system further comprises initially authenticating and determining the integrity of the software part in an instance in which the first hash matches the decrypted hash.

3. A method according to claim 1 wherein determining authenticity and integrity of the software part in an instance in which the air vehicle lacks data communications connectivity with an off-board security system further comprises flagging the software part as potentially lacking authenticity or integrity in an instance in which the first hash fails to match the decrypted hash.

4. A method according to claim 1 further comprising updating the whitelist as the software parts carried by the air vehicle change.

5. A method according to claim 1 wherein transmitting the first hash to the off-board security system once data communications connectivity is established comprises auditing the integrity of the software part.

6. A method according to claim 1 wherein decrypting an encrypted hash of a software part comprises decrypting a hash of a software part that has been encrypted with a private key of an airline with a public key of the airline.

7. A system for authenticating and determining integrity of a software part of an air vehicle comprising:
   an on-board computing system comprising a processor and memory configured to determine a first hash of digital data that comprises the software part, said on-board computing system also configured to utilize first and second different techniques to determine authenticity and integrity of the software part depending upon whether the air vehicle has data communications connectivity with an off-board security system in which case the first technique is utilized or lacks data communications connectivity with the off-board security system in which case the second technique is utilized,
   wherein, in an instance in which the air vehicle lacks data communications connectivity with an off-board security system, said on-board computing system is configured to determine authenticity and integrity of the software part in accordance with the second technique by decrypting an encrypted hash of a software part in accordance with a public-private key pair to create a decrypted hash, comparing the first hash with the decrypted hash, executing the software part in an instance in which the first hash matches the decrypted hash without awaiting establishment of data communications connectivity with the off-board security system and thereafter transmitting the first hash to the off-board security system, following execution of the software part, once data communications connectivity is established, and wherein, in an instance in which the air vehicle has data communications connectivity with the off-board security system, said on-board computing system is configured to determine the integrity of the software part in accordance with the first technique by transmitting the first hash to the off-board security system for comparison with a whitelist including a plurality of hashes of authentic software parts.

8. A system according to claim 7 wherein the on-board computing system is configured to determine authenticity and integrity of the software part in an instance in which the air vehicle lacks data communications connectivity with an off-board security system by initially authenticating and determining the integrity of the software part in an instance in which the first hash matches the decrypted hash.

9. A system according to claim 7 wherein the on-board computing system is configured to determine authenticity and integrity of the software part in an instance in which the air vehicle lacks data communications connectivity with an off-board security system by flagging the software part as potentially lacking authenticity or integrity in an instance in which the first hash fails to match the decrypted hash.

10. A system according to claim 7 wherein the off-board security system is configured to update the whitelist as the software parts carried by the air vehicle change.

11. A system according to claim 7 wherein the on-board computing system is configured to transmit the first hash to the off-board security system once data communications connectivity is established in order to audit the integrity of the software part.

12. A system according to claim 7 wherein the on-board computing system is configured to decrypt an encrypted hash of a software part by decrypting a hash of a software part that has been encrypted with a private key of an airline with a public key of the airline.

13. A computer program product for authenticating and determining integrity of a software part of an air vehicle and comprising at least one non-transitory computer-readable storage medium having computer-executable program code portions stored therein, the computer-executable program code portions comprising:
    program code instructions for determining a first hash of digital data that comprises the software part; and
    program code instructions for utilizing first and second different techniques to determine authenticity and integrity of the software part depending upon whether the air vehicle has data communications connectivity with an off-board security system in which case the first technique is utilized or lacks data communications connectivity with the off-board security system in which case the second technique is utilized,
    wherein the program code instructions are configured to determine authenticity and integrity of the software part in an instance in which the air vehicle lacks data communications connectivity with an off-board security system in accordance with the second technique by:
        decrypting an encrypted hash of a software part in accordance with a public-private key pair to create a decrypted hash;
        comparing the first hash with the decrypted hash;
        executing the software part in an instance in which the first hash matches the decrypted hash without awaiting establishment of data communications connectivity with the off-board security system; and
        thereafter transmitting the first hash to the off-board security system, following execution of the software part, once data communications connectivity is established; and
    wherein the program code instructions are configured to determine the integrity of the software part in an instance in which the air vehicle has data communications connectivity with the off-board security system in accordance with the first technique by transmitting the first hash to the off-board security system for comparison with a whitelist including a plurality of hashes of authentic software parts.

14. A computer program product according to claim 13 wherein the program code instructions for determining authenticity and integrity of the software part in an instance in which the air vehicle lacks data communications connectivity with an off-board security system further comprise program code instructions for initially authenticating and determining the integrity of the software part in an instance in which the first hash matches the decrypted hash.

15. A computer program product according to claim 13 wherein the program code instructions for determining authenticity and integrity of the software part in an instance in which the air vehicle lacks data communications connectivity with an off-board security system further comprise program code instructions for flagging the software part as potentially lacking authenticity or integrity in an instance in which the first hash fails to match the decrypted hash.

16. A computer program product according to claim 13 wherein the whitelist is updated as the software parts carried by the air vehicle change.

17. A computer program product according to claim 13 wherein the program code instructions for transmitting the first hash to the off-board security system once data communications connectivity is established comprise program code instructions for auditing the integrity of the software part.

18. A computer program product according to claim 13 wherein the program code instructions for decrypting an encrypted hash of a software part comprise program code instructions for decrypting a hash of a software part that has been encrypted with a private key of an airline with a public key of the airline.

19. A system for authenticating and determining integrity of a software part of an air vehicle comprising:
    an off-board security system having access to a whitelist include a plurality of hashes of authentic software parts; and
    an on-board computing system comprising a processor and memory configured to determine a first hash of digital data that comprises the software part, said processor of said on-board computing system also configured to utilize first and second different techniques to determine authenticity and integrity of the software part depending upon whether the air vehicle has data communications connectivity with an off-board security system in which case the first technique is utilized or lacks data communications connectivity with the off-board security system in which case the second technique is utilized,
    wherein the processor of the on-board computing system is configured to determine authenticity and integrity of the software part in an instance in which the air vehicle lacks data communications connectivity with the off-board security system in accordance with the second technique by decrypting an encrypted hash of a software part in accordance with a public-private key pair to create a decrypted hash, comparing the first hash with the decrypted hash, executing the software part in an instance in which the first hash matches the decrypted hash without awaiting establishment of data communications connectivity with the off-board security system and thereafter transmitting the first hash to the off-board security system, following execution of the software part, once data communications connectivity is established, and wherein the processor of said on-board computing system further configured to determine the integrity of the software part in an instance in which the air vehicle has data communications connectivity with the off-board security system in accordance with the first technique by transmitting the first hash to the off-board security system, wherein the off-board security system comprises a processor configured to compare the first hash provided by the on-board computing system with the whitelist and to provide an indication of the integrity of the software part.

20. A system according to claim 19 wherein the processor of the on-board computing system is configured to determine authenticity and integrity of the software part in an instance in which the air vehicle lacks data communications connectivity with the off-board security system by initially authenticating and determining the integrity of the software part in an instance in which the first hash matches the decrypted hash.

* * * * *